United States Patent
Kois

(10) Patent No.: US 10,389,743 B1
(45) Date of Patent: Aug. 20, 2019

(54) TRACKING OF SOFTWARE EXECUTABLES THAT COME FROM UNTRUSTED LOCATIONS

(71) Applicant: SYMANTEC CORPORATION, Mountain View, CA (US)

(72) Inventor: Aleksander Kois, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 157 days.

(21) Appl. No.: 15/387,887

(22) Filed: Dec. 22, 2016

(51) Int. Cl.
- *G06F 21/50* (2013.01)
- *G06F 21/56* (2013.01)
- *H04L 29/06* (2006.01)

(52) U.S. Cl.
CPC .......... *H04L 63/1425* (2013.01); *G06F 21/56* (2013.01); *G06F 21/50* (2013.01); *G06F 2221/034* (2013.01)

(58) Field of Classification Search
CPC ....... H04L 63/1425; G06F 21/56; G06F 21/50
See application file for complete search history.

(56) References Cited

U.S. PATENT DOCUMENTS

| | | | |
|---|---|---|---|
| 7,266,655 B1 | 9/2007 | Escabi, II et al. | |
| 7,328,217 B2 | 2/2008 | Borthakur et al. | |
| 7,694,150 B1 * | 4/2010 | Kirby | G06F 21/55 713/188 |
| 7,725,438 B1 | 5/2010 | Shah et al. | |
| 7,756,833 B2 | 7/2010 | van Ingen et al. | |
| 7,937,758 B2 * | 5/2011 | Kronenberg | G06F 21/56 726/22 |
| 7,953,945 B2 | 5/2011 | Bender et al. | |
| 7,975,308 B1 | 7/2011 | Satish et al. | |
| 7,987,158 B2 | 7/2011 | Boyd et al. | |
| 8,024,298 B2 | 9/2011 | Dile et al. | |
| 8,046,332 B1 | 10/2011 | Pruthi et al. | |
| 8,055,862 B2 | 11/2011 | Bender et al. | |
| 8,380,678 B2 | 2/2013 | Manson | |
| 8,499,350 B1 | 7/2013 | Satish | |
| 8,510,836 B1 | 8/2013 | Nachenberg | |

(Continued)

OTHER PUBLICATIONS

"TeraMerge® Enables Multiple Level Synthetic Backup Consolidation for the Full Version of the True incremental Backup System®", Teradactyl LLC, 2007, 4 pages.

(Continued)

*Primary Examiner* — Michael Pyzocha
(74) *Attorney, Agent, or Firm* — Meyertons Hood Kivlin Kowert and Goetzel PC; Rory D. Rankin

(57) ABSTRACT

A system and method for tracking content derived from unverified sources are described. A tracking application determines a file is untrusted when it is obtained from an unverified or untrusted source. Examples of unverified sources include remote servers accessed through a network and removable storage devices. The application marks the file as untrusted by inserting an identification of the file in a watchlist. A filter driver monitors I/O transactions and conveys information regarding file operations and corresponding processes to the tracking application. The filter driver detects a trusted process touches an untrusted file. The application marks the process as being untrusted. The filter driver detects the process subsequently touches another file. The application then marks this other file as untrusted.

20 Claims, 6 Drawing Sheets

(56) References Cited

U.S. PATENT DOCUMENTS

| | | | | |
|---|---|---|---|---|
| 9,516,053 | B1* | 12/2016 | Muddu | G06F 16/254 |
| 9,558,051 | B1* | 1/2017 | Taylor | G06F 9/546 |
| 2004/0078334 | A1 | 4/2004 | Malcolm et al. | |
| 2007/0182714 | A1 | 8/2007 | Pemmaraju | |
| 2008/0184358 | A1 | 7/2008 | Stamos et al. | |
| 2009/0271412 | A1 | 10/2009 | Lacapra et al. | |
| 2009/0307286 | A1 | 12/2009 | Laffin | |
| 2009/0320134 | A1* | 12/2009 | Corcoran | G06F 21/562 726/24 |
| 2010/0274763 | A1 | 10/2010 | van Ingen et al. | |
| 2011/0225655 | A1* | 9/2011 | Niemela | G06F 21/566 726/24 |
| 2012/0255003 | A1* | 10/2012 | Sallam | G06F 21/554 726/23 |
| 2012/0323829 | A1* | 12/2012 | Stokes | G06F 21/563 706/12 |
| 2013/0055338 | A1* | 2/2013 | McDougal | G06F 21/56 726/1 |
| 2014/0165203 | A1* | 6/2014 | Friedrichs | G06F 21/56 726/24 |
| 2015/0256549 | A1* | 9/2015 | Spurlock | G06F 21/52 726/23 |
| 2017/0118240 | A1* | 4/2017 | Devi Reddy | G06N 7/005 |
| 2017/0193218 | A1* | 7/2017 | Shin | G06F 21/556 |
| 2017/0302685 | A1* | 10/2017 | Ladnai | H04L 63/1416 |

OTHER PUBLICATIONS

"Partial Cumulative Incremental Backups Offer Unique Advantages to Customers", Teradactyl LLC, 2007, 4 pages.

"TeraMerge® Enables Single Level Synthetic Backup Consolidation for the Lite Version of the True incremental Backup System®", Teradactyl LLC, 2007, 6 pages.

Gittlen, Sandra, "Options emerge for combating stealth Web transaction attacks", Oct. 5, 2007, 3 pages, http://www.computerworld.com/action/article.do?command=printArticleBasic&articleId=9041042. [Retrieved Oct. 22, 2007].

Gühring, Philipp, "Concepts against Man-in-the-Browser Attacks" Jun. 16, 2006, 15 pages, http://svn.cacert.org/CAcert/SecureClient.pdf. [Retrieved Oct. 22, 2007].

Wang, Chenxi, "Man-In-The Browser: Emerging Attacks Exploit Browser Vulnerabilities", Executive Summary, Apr. 17, 2007, 1 page, http://www.forrester.com/Research/Document/Excerpt/0,7211,42042,00.html. [Retrieved Oct. 22 2007].

"RansomWhere?", Objective-See LLC, 2016, 6 pages, https://objective-see.com/products/ransomwhere.html. [Retrieved Oct. 26, 2016].

Faulkner, Jason, "What Causes the "File Downloaded from the Internet" Warning and How Can I Easily Remove It?", How-To Geek, LLC, Aug. 22, 2011, 8 pages, http://www.howtogeek.com/70012/what-causes-the-file-downloaded-from-the-internet-warning-and-how-can-i-easily-remove-it/. [Retrieved Oct. 26, 2016].

* cited by examiner

FIG. 6

Table 600

| Parameter 602 | Source 604 | Source Weight 606 | Data Type 608 | Data Type Weight 610 | Data Amount 612 | Data Amount Weight 614 | Transaction Type 616 | Transaction Type Weight 618 | Overall Weight 620 |
|---|---|---|---|---|---|---|---|---|---|
| Edge0 | Untrusted Source | 1.0 | N/A | N/A | 1KB | 1.0 | Store/Obtain | 1.0 | 1.0 |
| Node1 | Edge6 | 1.0 | .zip | 1.0 | N/A | N/A | N/A | N/A | 1.0 |
| Edge1-2 | Node1 | 1.0 | N/A | N/A | 3KB | 1.0 | Write (Create) | 1.0 | 1.0 |
| Node2 | Node1, Edge1-2 | 1.0 x 1.0 x 0.9 | .exe | 1.0 | N/A | N/A | N/A | N/A | 0.9 |
| Edge2-3 | Node2 | 0.9 | N/A | N/A | 200B | 0.4 | Write (Create) | 1.0 | 0.36 |
| Node3 | Node2, Edge2-3 | 0.9 x 0.36 x 0.8 | .config | 0.5 | N/A | N/A | N/A | N/A | 0.13 |
| Edge6 | Trusted File6 | 0.4 | N/A | N/A | 400B | 0.6 | Write (Create) | 1.0 | 0.24 |
| Node4 | Edge6 | 0.24 | .log | 0.2 | N/A | N/A | N/A | N/A | 0.05 |
| Edge3-5 | Node3 | 0.13 | N/A | N/A | 100B | 0.1 | Write (Create) | 1.0 | 0.01 |
| Node5 | Node3, Edge3-5 | 0.13 x 0.01 x 0.7 | .log | 0.1 | N/A | N/A | N/A | N/A | 0.0 |

TRACKING OF SOFTWARE EXECUTABLES THAT COME FROM UNTRUSTED LOCATIONS

BACKGROUND OF THE INVENTION

Field of the Invention

This invention relates to the field of computer security and, more particularly, to tracking content derived from unverified sources.

Description of the Related Art

Users of computing devices access information from multiple sources for a variety of reasons, such as performing business transactions, updating work flows and presentations, file sharing, communicating through one or more of email, intranet sites and social networking sites, and so forth. These multiple sources include Web pages hosted on remote Web servers and data on removable storage devices. These external types of sources lack a relatively high level of control for providing security as done for other internal sources, such as enterprise servers hosting Intranet content or applications received from a trusted manufacturer for installment. Accordingly, these external sources are not deemed trustworthy (i.e., they are "untrusted") compared to the internal sources. The content retrieved from these external sources and stored on a user's computing device is deemed untrusted until the content is verified by one or more security applications. During the time period between retrieving and verifying through security applications, accesses of the content yet to be verified may create additional other untrusted and unverified content.

In view of the above, improved systems and methods for tracking content derived from untrusted sources are desired.

SUMMARY OF THE INVENTION

Systems and methods for tracking content derived from unverified sources are contemplated. A user's computing device receives content from many sources for storage. The sources include both trusted sources and untrusted sources. One example of an untrusted source is a remote Web server providing content from Web browsing download operations to be stored in a file system folder on the computing device. Another example of an untrusted source is a removable storage device also providing content to be stored in a file system folder on the computing device. Although in many cases the content is later verified by one or more security applications, for some period of time the content is untrusted.

While untrusted content is resident on the computing system, one or more other processes may access the untrusted content stored on the user's computing device. In some embodiments, content retrieved from an untrusted source may be in the form of an archive type file (e.g., a zip file, or otherwise). In various embodiments, one or more executable files are extracted from an archive file. During the accessing of the content, the processes copy the content, extract executable files and configuration files from the archive files within the content, transfer the executable files and configuration files, and/or execute the executable files with the configuration files. The processes are capable of creating copies of executable files extracted from the archive files. The copies are placed in at least one or more storage locations among the user's computing device, other computing devices, removable storage devices and so forth. Other processes are capable of accessing these copies and so on. While the executable files, and other data, are still unverified and are not blocked, these files may affect a variety of other processes accessing data from a variety of storage locations.

In various embodiments, the user's computing device includes a filter driver. In various embodiments, the filter driver comprises program code used to monitor one or more system folders accessible by the user's computing device. Therefore, the filter driver is capable of determining when new content is added to the monitored system folder or when content is accessed within the monitored system folder.

In various embodiments, a tracking application determines a particular file is untrusted based on determining the particular file was received from an untrusted source. In one example, the untrusted file is an archive file now stored on the user's computing device in a Web browser downloads system folder. In the example, the archive file is named "A.zip." As this new content is obtained by the user's computing device, the filter driver adds an identification of the new content in a watchlist of untrusted content. One of a variety of data structures may be used to maintain such a watchlist.

The filter driver monitors when processes touch content that is included in the watchlist. A process is considered to touch another file when the process performs a read and/or write of the file. Continuing with the example, the filter driver determines a process resulting from execution of a given file, which is named unzip.exe that is not identified as being untrusted (e.g., does not have an untrusted indication in the watchlist). Therefore, the given file, unzip.exe, is deemed to be a trusted file. In other embodiments, the application deems the given file is a trusted file based on determining the given file is from a verified/trusted source such as a remote server within an enterprise or a verified and secure application. The filter driver detects that the process reads the untrusted archive file, A.zip, and creates other files. In this example, the other files include an executable file named A.exe and other data such as a configuration file named A.config.

The application determines that the process is associated with an untrusted executable file unzip.exe and has touched the files A.exe and A.config by creating them. In response, the application inserts indications of the files A.exe and A.config and the process running the file unzip.exe into the watchlist that indicate they are untrusted.

As trusted processes read from the untrusted files A.exe and A.config, any additional files created or modified by the process are also marked as untrusted. Indications of these created or modified files are inserted into the watchlist in addition to the process running the trusted file that created them. In some embodiments, the system protection mechanisms block functionality of untrusted executable files found by searching the watchlist and finding a hit. In other embodiments, the system protection mechanisms block functionality of any executable file stored within a location with a corresponding indication found in the watchlist.

These and other embodiments will be appreciated upon reference to the following description and accompanying drawings.

BRIEF DESCRIPTION OF THE DRAWINGS

FIG. 6 is a generalized diagram illustrating one embodiment of a table for tracking weights of nodes in a node graph tracking content derived from unverified sources.

Figure 1:
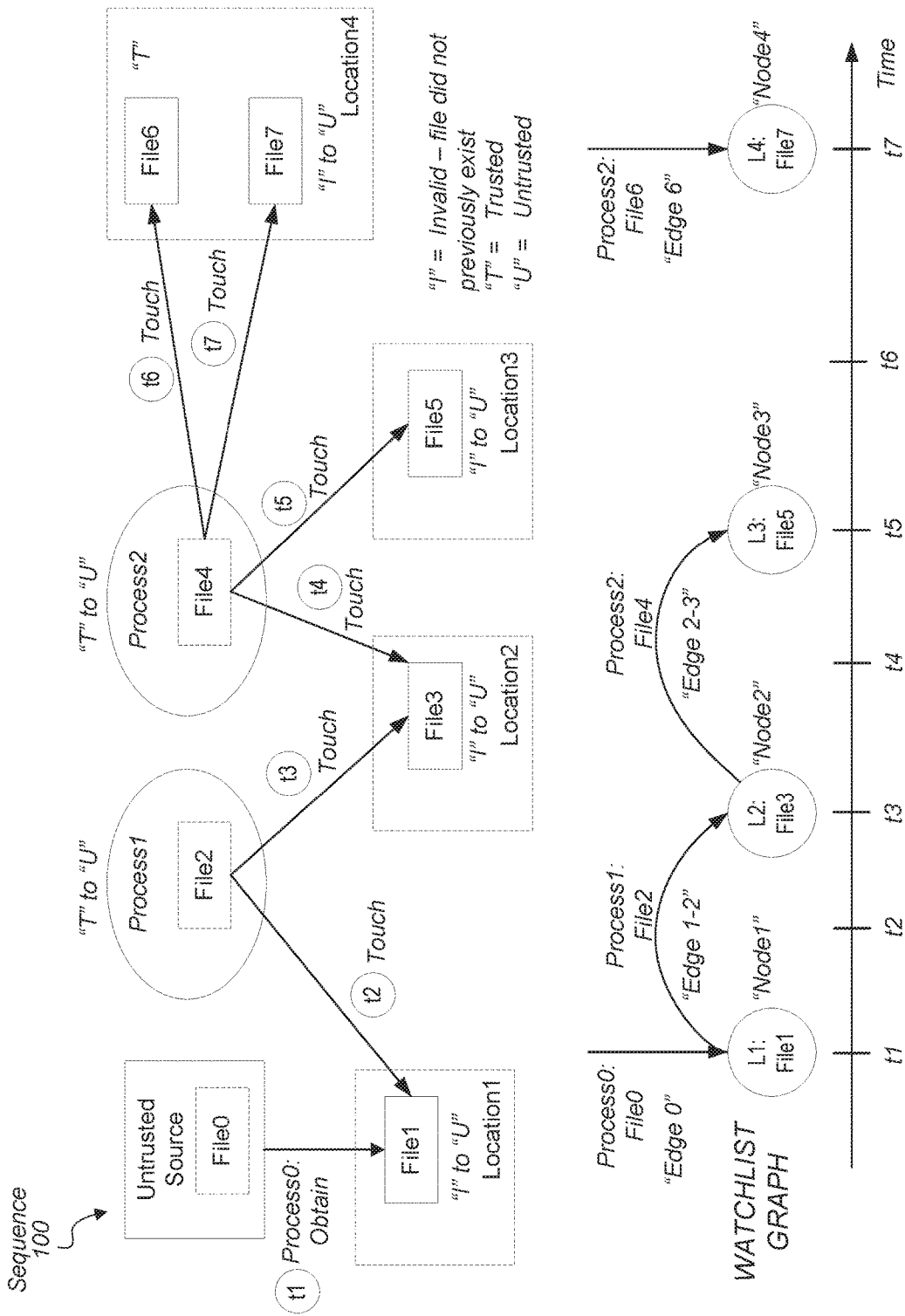
FIG. 1 is a generalized diagram illustrating one embodiment of a node graph for tracking content derived from unverified sources.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized diagram of one embodiment of a node graph for tracking content derived from unverified sources is shown. In the embodiment shown, a sequence of time steps t1 to t7 are shown where both trusted files and untrusted files are accessed. There are two processes indicated as Process1 and Process2 in FIG. 1 The hardware and software components, such as processing units, buses, interfaces, operating systems and so forth, used to execute the processes and access the files are not shown for ease of illustration. A description of the hardware and software components follows at a later time.

At time t1, the File1 is received or otherwise obtained from the Untrusted Source and stored in Location1 by Process0. In various embodiments, the Untrusted Source is a source of content that has not been verified or known to have been verified. Examples of unverified sources include removable storage devices and remote servers accessed through a network. In some embodiments, the remote servers are Web servers accessed through the Internet. Verification is done by one or more security applications and/or by a system administrator installing content on particular servers. Some remote servers are verified servers, such as servers within a private network, which is made accessible only to members of a particular organization. An Intranet is one example of the private network.

In some embodiments File1 is an archive file, though it could be any type of file. After being received, File1 is stored in system memory on a user's computing device. Examples of a computing device are a laptop, a smartphone, a tablet computer, a desktop computer, or otherwise. File1 is marked as untrusted as it was obtained from an untrusted source. File1 is shown as marked with "U," which indicates untrusted. Prior to being created, File1 did not exist, so the indication "I" for invalid is used (for purposes of illustration) to indicate that File1 did not previously exist. In various embodiments of the data structure/database, such an "invalid" indication to indicate the file did not previously exist is not used.

In various embodiments, a watchlist (e.g., data structure or database) of untrusted content is maintained. In the example of FIG. 1, the watchlist is a node graph. The first node shown, Node1, is inserted in the watchlist at time t1. Node1 is shown to include an identification of File1 and its storage location "L1," which indicates Location1. In various embodiments, other information used to describe File1 is stored in Node1 but not shown for ease of illustration. In some embodiments, as Process® touches the untrusted File1 by performing a store operation, an indication of "Edge 0" is inserted in the watchlist node graph with information indicating Process® connects, or is otherwise associated with, the Untrusted Source and File1. In various embodiments, the indication includes at least a process identifier (ID) for Process0.

At a later time, a processing unit executes trusted File2 which spawns Process1. File2 is shown as marked with "T," which indicates trusted. In some embodiments, the processing unit is within the user's computing device. In other embodiments, the processing unit is within a remote computing device and communicates with the user's computing device through a network connection. In one example, File2 is a trusted executable file used for accessing archive files and File1 is an untrusted archive file.

At time t2, Process1 then touches the untrusted File1 by performing a read operation targeting File1. A process is considered to touch a file when the process performs a read and/or write of the file. A lookup into the watchlist provides a hit for File1 as Node1 is present and corresponds to File1. In some embodiments, an indication is stored indicating the trusted Process1 touched the untrusted File1 and now Process1 is untrusted. In some embodiments, the indication remains stored until Process1 completes. However, as it is possible for a given process to run for a relatively long period of time, in some embodiments time limit is established for the indication to remain. In various embodiments, the selection is made by a system administrator. When the given time limit is reached, the indication is removed.

At time t3, Process1 touches File3 stored in Location2. For example, if File1 is an archive file, then File3 may represent a file extracted from the archive. The extracted file is then written by Process1 to Location 2 (L2). In this scenario, the untrusted archive file, File1, is read by Process1 which causes Process1 to become untrusted. As Process1 has now created File3, the new File3 is considered untrusted and an indication to this effect is stored. File3 is shown as marked with "U" in FIG. 1 which indicates untrusted. Prior to being created, File3 did not exist, so the indication "I" for invalid is used to indicate File3 did not previously exist. Similar to the insertions steps for File1, a node corresponding to File3 is inserted in the watchlist at time t3.

It is noted that in various embodiments, the insertion steps for nodes in the watchlist occur after a corresponding touching operation completes. In other embodiments, the insertion steps occur during the touching operation, but the nodes are removed should the touching operation end without completion. In this example, Node2 is inserted in the watchlist at time t3. Node2 is shown to include at least an indication of File3 and its storage location "L2," which indicates Location2. In various embodiments, other information used to describe File3 is stored in Node2 but not shown for ease of illustration. Additionally, an indication of "Edge 1-2" is inserted in the watchlist node graph with information indicating Process1 connects, or is otherwise associated with, Node1 and Node2. In various embodiments, the indication includes at least a process identifier (ID) for Process1.

At some point in time, a processing unit initiates Process2 by executing trusted File4. As File4 is trusted, Process2 is likewise trusted. In some embodiments, the processing unit processing Process2 is the same processing unit processing Process1. In other embodiments, the processing unit processing Process2 is a different processing unit. At time t4, Process2 touches the untrusted File3 by reading from File3. A lookup into the watchlist provides a hit for File3 as Node2 is present and corresponds to File3. As a result of touching untrusted File3, Process2 is updated from being trusted to being untrusted. In some embodiments, an indication is stored indicating the Process2 touches the untrusted File3.

At time t5, the untrusted Process2 touches File5 stored in Location3. In one example, Process2 creates File5 after reading File3. As the earlier stored indication still remains indicating Process2 is untrusted, File5 which his created by Process2 is also marked as untrusted. File5 is shown as marked with "U," which indicates untrusted. Prior to being created, File5 did not exist, so the indication "I" for invalid is used to indicate File5 did not previously exist.

Similar to the insertions steps for File1 and File3, a node corresponding to File5 is inserted in the watchlist at time t5. Node3 is inserted in the watchlist at time t5. Node3 is shown to include at least an indication of File5 and its storage location "L3," which indicates Location3. Additionally, an indication of "Edge 2-3" is inserted in the watchlist node graph with information indicating Process2 is associated with Node2 and Node3. In various embodiments, the indication includes at least a process ID for Process2.

At time t6, the untrusted Process2 touches the trusted File6 by reading from File6. A lookup into the watchlist provides a hit for Process2. In this case, as Process 2 performed a read of File6 and did not write to or modify File6, the state of File6 remains trusted.

At a later time t7, during execution of Process2, Process2 touches File7 by creating File7. A lookup into the watchlist provides a hit for Process2 as being untrusted. Consequently, File7 is deemed untrusted and File7 is shown as marked with "U". Prior to being created, File7 did not exist, so the indication "I" for invalid is used to indicate File7 did not previously exist. Node4 is inserted in the watchlist at time t7. Node4 is shown to include at least an indication of File7 and its storage location "L4," which indicates Location4. Similar to other inserted nodes, other information used to describe File7 is stored in Node4 but it is not shown for ease of illustration. Additionally, an indication of "Edge 6" is inserted in the watchlist node graph with information indicating Process2 is associated with File6 and Node5. In various embodiments, the indication includes at least a process ID for Process2.

Figure 2:
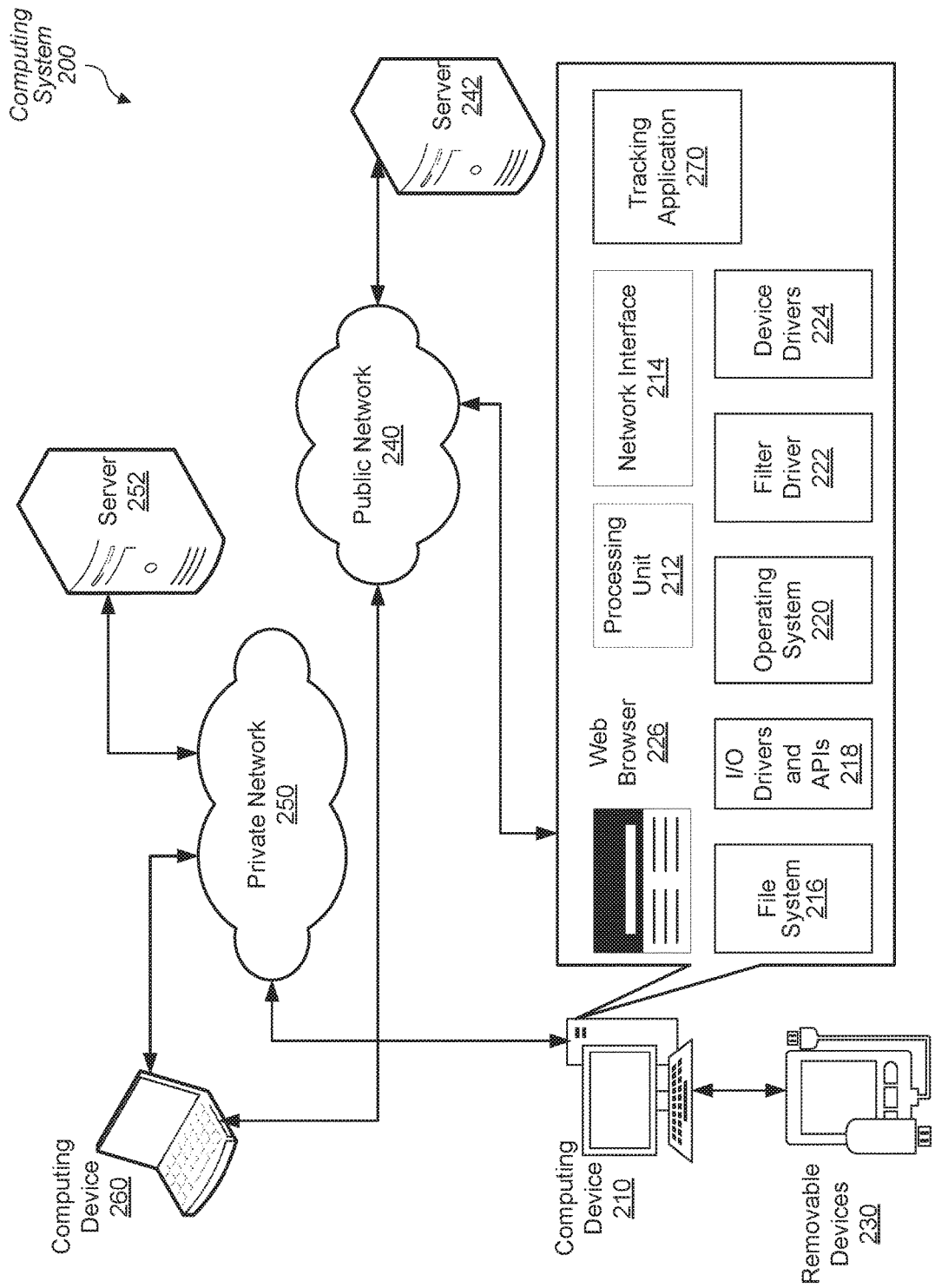
FIG. 2 is a generalized diagram illustrating one embodiment of a computing system.

Turning now to FIG. 2, a generalized diagram illustrating one embodiment of a computing system 200 is shown. In the illustrated embodiment, the computing system 200 includes a public network 240 and a private network 250, which is part of an organizational center. Computing devices 210 and 260 are shown connected to each of the networks 240 and 250. Each of the networks 240 and 250 is additionally accessed by servers 242 and 252, respectively. Although two computing devices 210 and 260 in addition to two servers 242 and 252 are shown, in various embodiments, the computing system 200 includes any number of computing devices and servers. Each of the computing devices 210 and 260 is representative of a variety of computing devices such as a desktop computer, a laptop, a smartphone, a tablet computer, or otherwise.

In various embodiments, the private network 250 within an organizational center is an intranet network providing a network accessible only to members of a particular organization. An intranet portal may be used to provide access to resources with a user-friendly interface such as graphical user interfaces (GUIs) and dashboards. In some embodiments, the organizational center housing the private network 250 is supported by software such as Microsoft SharePoint, Huddle, and Google for Work, and so forth.

Information and services stored on server 252 are made available by the private network 250 to particular members and are unavailable to the general public through direct access. For example, persons could not use the Internet to directly access the information and services provided by the private network 250. Through user authentication, staff members are able to access resources through the private network 250 to communicate with other staff members, collaborate on projects and monitor product development, update products, documents and tools stored in a centralized repository and so forth. The private network 250 includes one or more web portals, search engines, tools for data visualization and so forth.

The server 252 is representative of a variety of server types such as database servers, computing servers, application servers, file servers, mail servers and so on. In various embodiments, the server 252 and the computing devices 210 and 260 operate with a client-server architectural model. In various embodiments, the content stored on server 252 is considered secure as verification is done by one or more security applications and/or by a system administrator installing content prior to the content is made available through the private network 250. In various embodiments, the organizational center also supports an extranet network (not shown) which allows customers, partners, and suppliers to securely access a selected portion of the resources available within the private network 250.

The computing device 210 additionally communicates and transfers information with the server 242 via the public network 240. The connections between the computing device 210 and the remote server 242 include at least the Internet, wherein each of the computing device 210 and the remote server 242 use the Hypertext Transfer Protocol (HTTP) to transfer messages. Accordingly, in various embodiments, the public network 240 is the Internet. Multiple routers, switches, network cables, wireless technologies and so forth may be used in the public network 240 to transfer messages and content between the computing device 210 and the server 242.

In various embodiments, the content stored on server 242 is not considered secure as it is unknown whether verification has been performed at all let alone by a system administrator, a user or other. Therefore, the server 242 is considered to be an unverified source, whereas the server 252 is considered to be a verified source. The removable devices 230 include any of a variety of removable storage devices such as portable hard disk drives, portable Flash drives, smartphones, and so forth. Similar to the remote public server 242, it is unknown whether verification has been performed at all let alone by a system administrator, a user or another trusted user on the content stored on the removable devices 230. Therefore, any storage device among the removable storage devices 230 is considered to be an unverified source like the public server 242. Other examples of unverified sources are possible and contemplated.

As shown, the computing device 210 includes the Web browser 226 for accessing content on the server 242 through the public network 240. The Web browser 226 is representative of a number of available World Wide Web browsers such as at least Internet Explorer, Firefox, Google Chrome and Safari. In various embodiments, the Web browser 226 uses a graphical user interface (GUI) to receive instructions and to present a rendered Web page to the user. In order for a user to access content stored on the public remote server 242, the computing device 210 receives an indication from the user to access the content and retrieves the content. The content includes one or more of a Web page and files such as executable files, configuration files and so forth. The computing device 210 includes the network interface 214 for transferring information through the public network 240. In some embodiments, the computing device 210 includes other software and another network interface for transferring information through the private network 250. Each of the network interface 214 and any other network interfaces support one or more communication protocols for data and message transfers.

As shown, the computing device 210 includes a processing unit 212. In various embodiments, the processing unit 212 includes one or more processor cores within one or more processors. Each of the processor cores include circuitry for executing instructions according to a predefined general-purpose instruction set architecture (ISA). For example, the SPARC® instruction set architecture (ISA) may be selected. Alternatively, the x86, x86-64®, Alpha®, PowerPC®, MIPS®, PA-RISC®, or any other ISA may be selected. In other embodiments, the computing device 210 includes a system-on-a-chip (SOC) with one or more processors utilizing very wide single instruction multiple data (SIMD) architectures to achieve high throughput in highly data parallel applications. In such embodiments, the computing device 210 includes one or more of a graphics processing unit (GPU), a digital signal processor (DSP), and the like.

As shown, the computing device 210 includes several software components 216-226. The computing device 210 additionally includes one or more software applications and files (not shown). In some embodiments, one or more of the software components are paged in and out of a main memory in a conventional manner from a storage medium such as a hard drive (not shown). The operating system 220 within the computing device 210 is a Mac OS X operating system, a Microsoft Windows operating system, a Unix-like operating system, a mobile device operating system, or a combination wherein a hard disk is partitioned to host multiple operating systems. The operating system 220 controls the physical resources of the computing device 210, such as allocation of the physical resources and management of external storage such as the removable devices 230.

The computing device 210 also includes one or more device drivers 224 and input/output (I/O) drivers and I/O APIs 218. The drivers 218 and 224 provide access to a variety of storage devices and support the corresponding data transfer protocols. In some embodiments, the computing device 210 uses the file system 216 to provide a special-purpose database for the storage, organization, manipulation, and retrieval of data. In some embodiments, file system 216 provides access to data by operating as a client for a network protocol. In other embodiments, file system 216 is virtual and exists only as an access method for virtual data. In some embodiments, the computing device 210 supports more file systems other than file system 216. The computing device 210 is capable of supporting multiple file system formats.

In various embodiments, the file system 216 supports data organization which includes a hierarchy of directories and folders within the directories. The directories and folders store data as files. The files include executable files, text files, configuration files, library files and so forth. File system 216 stores information corresponding to the organization of the files. The organization information includes the storage locations used for storing the files. For example, in various embodiments, the organization information identifies the particular storage device as well as the directory and folders used to store the file. Additionally, file system 216 stores other information corresponding to the files such as a file name, a file extension indicating a file type, a file size, file ownership, file access permissions, a timestamp and so on.

The computing device 210 also includes the filter driver 222 configured to monitor I/O operations including reads and writes of data and processes associated with such I/O operations. Also included is a tracking application 270 configured to supports a watchlist of untrusted files and processes. In some embodiments, the watchlist is a node based graph. In such embodiments, the nodes include indications of suspicious files. The suspicious files are also referred to as unverified files and untrusted files. In various embodiments, the indications of the untrusted files include one or more of file names, file extensions, and the particular storage devices as well as the directories and folders used to store the files. In some embodiments, the nodes of the watchlist graph also include a signature corresponding to the particular file qualified for insertion. In various embodiments, the signature is an output of one of a variety of hash functions. In some embodiments, the chosen hash function receives one or more of the parameters included in the node as inputs. In other embodiments, the content of the file is also used as an input to the chosen hash function. Also included in the watchlist may be an identification of processes (e.g., process IDs) that are of have become untrusted. In various embodiments, this watchlist data may be stored and maintained in the form of some data structure(s), a database, or any other suitable form on a storage device coupled to the computing system 200. In various embodiments, the filter driver 222 communicates the monitored I/O activities to the tracking application 270 which then records and maintains corresponding information.

In various embodiments, the edges of the node graph include an indication of the process which touched the file causing the file to now be marked as suspicious. The edge also includes an indication of the trusted file within the process which touched the file having a corresponding node inserted in the graph. For example, when a trusted file, unzip.exe, is executed by a process, reads an untrusted file A.zip and creates the file A.exe, this created file A.exe has a corresponding node and edge inserted into the watchlist graph. In other embodiments, one of a variety of other data structures is used to maintain the watchlist of untrusted files. In various embodiments, the other data structures include records arranged in a different organization than the node graph, but the information within the records is similar to the information described above for the nodes and edges.

The filter driver 222 monitors operations sent to file system 216. In response to detecting operations from running processes which retrieve new content to be controlled by file system 216 or touch files already controlled by file system 216, the filter driver 222 conveys information (or otherwise makes such information available) to the tracking application 270. The information is then used by the tracking application 270 to determine whether an indication corresponding to a given process and a given file should be inserted in the watchlist of untrusted content and/or whether any other changes to the watchlist are needed.

In various embodiments, the filter driver 222 determines a particular file is untrusted based on determining the particular file is received from an unverified source. In some embodiments, the unverified source is a remote Web server accessed through an Internet connection rather than a trusted remote server accessed through a secure Intranet. In other embodiments, the unverified source is a removable storage device. The filter driver 222 determines the source of the retrieved file is an unverified source, generates a corresponding node for the retrieved file, and inserts the node in the watchlist. As described earlier, the filter driver 222 also determines when a file is created by a trusted executable file in a running process which touched an untrusted file. In such cases, the filter driver 222 generates a corresponding node and edge for the created file, and inserts the node and the edge in the watchlist.

In various embodiments, the filter driver 222 detects file read operations, file write/modify operations, file store operations which include file create operations, file delete/remove operations, file copy operations and file rename operations. As described earlier, a process is considered to touch a first file when the process performs a read and/or write of the first file. In various embodiments, the computing system 210 includes multiple filter drivers rather than a single filter driver 222. In some embodiments, a given filter driver is used for a given system folder within file system 216.

Figure 3:
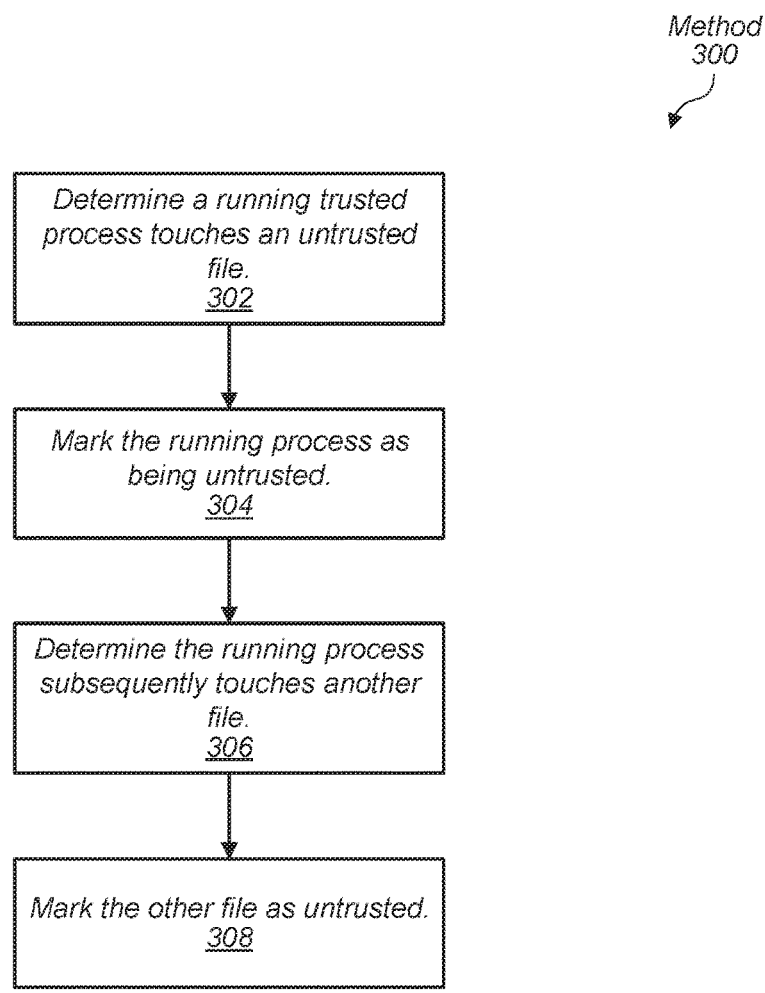
FIG. 3 is a generalized diagram illustrating one embodiment of a method for tracking content derived from unverified sources.

Referring now to FIG. 3, a generalized block diagram of one embodiment of a method 300 for tracking content derived from unverified sources is shown. For purposes of discussion, the steps in this embodiment are shown in sequential order. However, some steps may occur in a different order than shown, some steps may be performed concurrently, some steps may be combined with other steps, and some steps may be absent in another embodiment.

One or more software applications are executed where multiple processes are generated and assigned to hardware resources. During execution of the processes, it is determined a given running trusted process touches an untrusted file (block 302). As described earlier, in one example, during the execution of one or more processes, a trusted file, such as an executable file used for accessing an archive file, reads an untrusted archive file. The process is marked as untrusted and no longer trusted (block 304).

It is determined the same running process subsequently touches another file (block 306). For example, after the running and previously trusted process reads the untrusted archive file, the executable file in the running process, which is used for accessing archive files, creates at least one other file. As the running process is marked as untrusted, the file created by the running process is marked as untrusted (block 308).

In one example, an archive file named A.zip is stored on the F: drive corresponding to a removable storage device. A process running on the user's computing device later runs an executable file named unzip.exe. During execution, the process spawned by executing the executable file unzip.exe reads the content in A.zip and creates an executable file named A_RunMe.exe on the /temp directory of the C: drive of the user's computing device. As the archive file A.zip was accessed from an unverified source, such as the F: drive, the resulting created file C:\temp\A_RunMe.exe, is marked as untrusted by having a corresponding entry/node/record inserted into a watchlist data structure. Additionally, the running process corresponding to unzip.exe that read the content in A.zip is also marked as untrusted.

A subsequent process reads the content in C:\temp\A_RunMe.exe and creates an executable file named C:\Test\A_Copy_RunMe.exe on the user's computing device. As this file was created from an untrusted file with a corresponding entry/record/node in the watchlist, the resulting created file C:\Test\A_Copy_RunMe.exe is also marked as untrusted by having a corresponding entry/node/record inserted into a watchlist data structure. Additionally, the running process which executed copy.exe to read the content in C:\temp\A_RunMe.exe is also marked as untrusted. In some examples, the process is a different process that read the content in A.zip and the watchlist is used to determine the created file C:\Test\A_Copy_RunMe.exe is to be marked as untrusted. In other examples, the process is the same process which read the content in A.zip and this determination is used to mark the created file C:\Test\A_Copy_RunMe.exe as untrusted.

Figure 4:
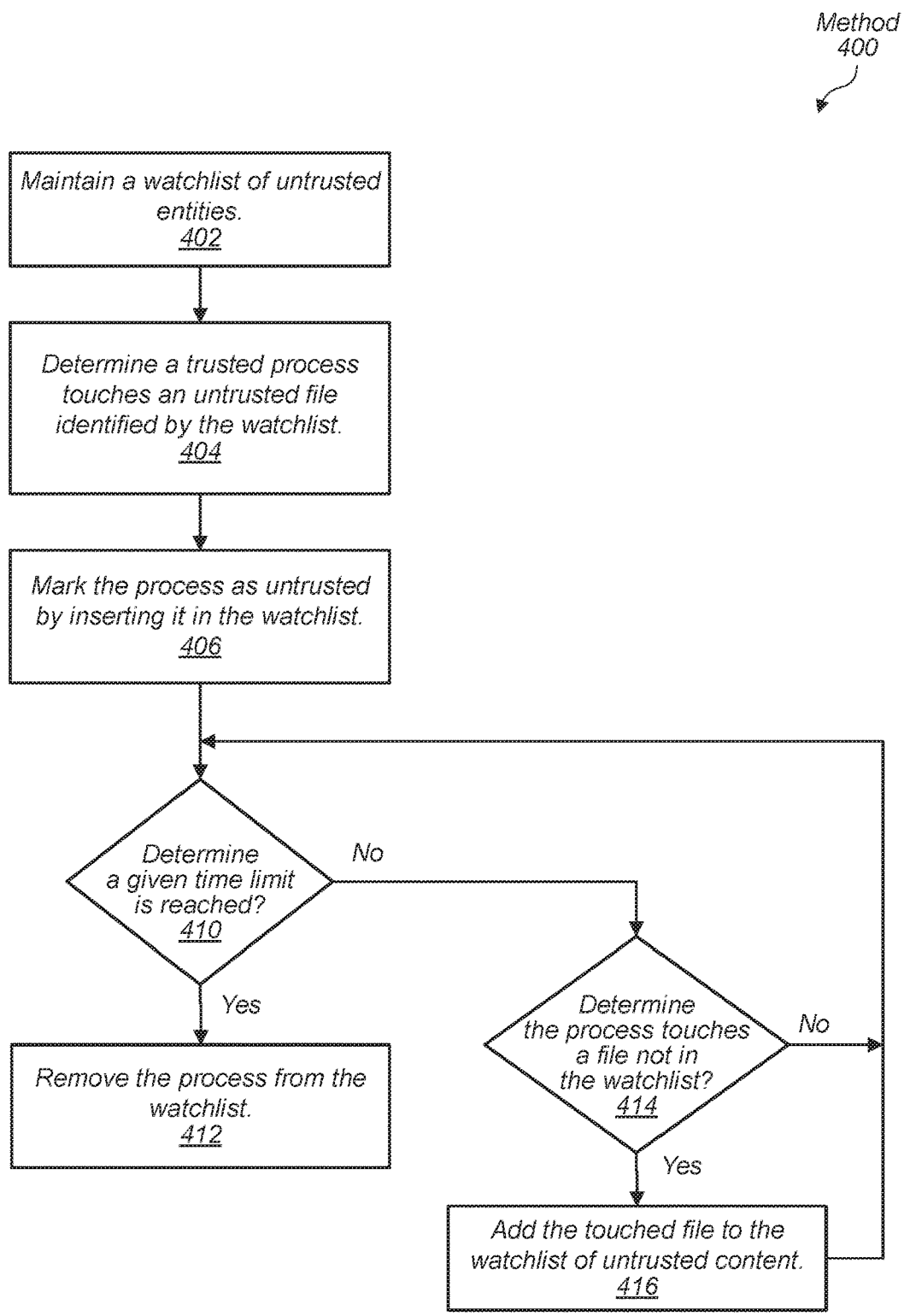
FIG. 4 is a generalized diagram illustrating one embodiment of a method for tracking content derived from unverified sources.

Turning now to FIG. 4, a generalized block diagram of another embodiment of a method 400 for tracking content derived from unverified sources is shown. For purposes of discussion, the steps in this embodiment are shown in sequential order. However, some steps may occur in a different order than shown, some steps may be performed concurrently, some steps may be combined with other steps, and some steps may be absent in another embodiment.

A watchlist of untrusted entities (files, processes, storage devices, or otherwise) is maintained (block 402). A node graph or a variety of other data structures is used to store and organize indications of untrusted files. It is then determined that a trusted process touches a second file with an indication stored in the watchlist that it is untrusted (block 404). As a result of touching the untrusted file, the process is marked as being untrusted by inserting a corresponding indication in the watchlist (block 406). The indication may include at least a process ID for the running process.

In some embodiments, the stored indication in the watchlist for the process remains until the process completes. However, as it is possible for a process to run for weeks or months, in other embodiments, a time limit may be established for the indication to remain. In various embodiments, the time limit is made by a system administrator. In other embodiments, the indication that the process is untrusted may remain for the life of the process. If the given time limit is reached ("yes" branch of conditional block 410), then the indication is removed (block 412).

If the given time limit is not reached ("no" branch of conditional block 410), and it is determined the process touches a third file not found in the watchlist ("yes" branch of the conditional block 414), then the third file is added to the watchlist of untrusted content (block 416). In some embodiments, as previously discussed, a read of an existing file by an untrusted process will not cause the file to then become untrusted if it is currently trusted. A write to such a file would cause the file to then become untrusted. Monitoring of the files continues as files are accessed. In various embodiments, the watchlist is updated when data, such as files marked as untrusted, are deleted. Similar to a process completing (i.e., ceases to exist) and having an indication in the watchlist removed, an indication for the data is removed from the watchlist when it is detected the data is deleted. In various embodiments, system protection mechanisms block functionality of untrusted executable files found by searching the watchlist and finding a hit. In addition to the above, in various embodiments the watchlist may be updated responsive to a status of data or processes changing. For example, software designed to scan data for viruses or other malicious content may verify that particular data identified as being untrusted is safe. In such a case, an indication may be conveyed or otherwise made available to the tracking software to this effect. In response, the watchlist is updated to remove the particular data (e.g., file) from the watchlist. In some cases, other data identified in the watchlist may also be removed due to the particular data being removed. For example, a given file may be identified in the watchlist as untrusted because it was created by a process that touched the particular data. However, the verification that the particular data is safe may in turn remove the reason for marking the given file as being untrusted. Consequently, the given file may be removed from the watchlist. Similarly, processes may likewise be removed from the watchlist. In some embodiments, the watchlist may serve as a database that identifies items that need to be scanned by virus detection or other software. In such a case, the information in the watchlist may be made available to the virus detection software. These and other embodiments are possible and are contemplated.

Figure 5:
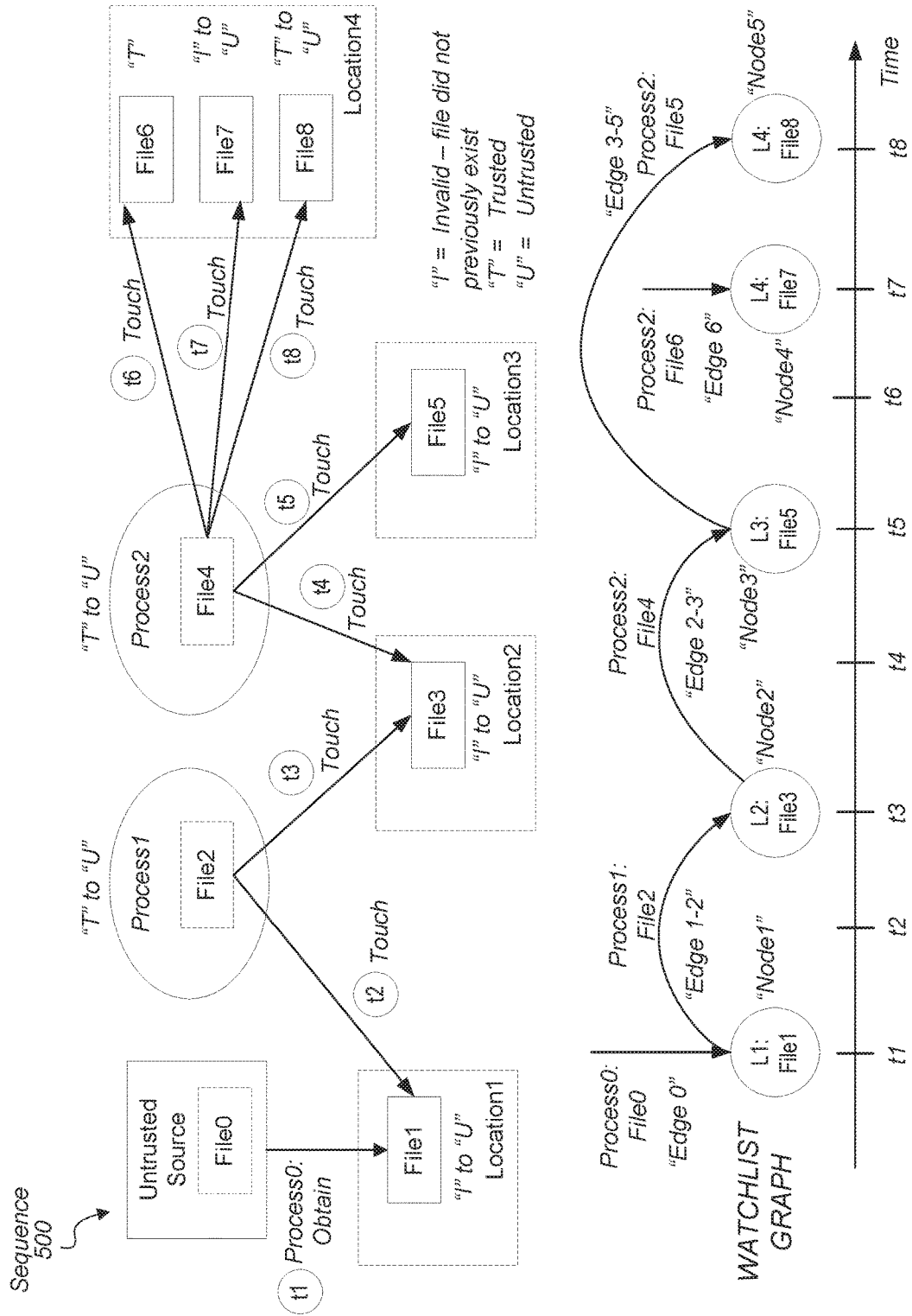
FIG. 5 is a generalized diagram illustrating another embodiment of a node graph for tracking content derived from unverified sources.

Referring to FIG. 5, a generalized diagram of another embodiment of a node graph for tracking content derived from unverified sources is shown. Nodes, Edges and Processes used previously in the embodiment illustrated in FIG. 1 are numbered identically. In the embodiment shown, a sequence of time steps t1 to t8 are shown where both trusted files and untrusted files are accessed. The sequence of time steps t1 to t7 are identical to the sequence previously described in FIG. 1.

At time t8, the untrusted Process2 touches File8 stored in Location4. In one example, Process2 creates File8 after reading File5 stored in Location3. As the earlier stored indication still remains indicating Process2 is untrusted and File5 is untrusted, File8 which his created by Process2 is also marked as untrusted. File8 is shown as marked with "U," which indicates untrusted. Prior to being created, File8 did not exist, so the indication "I" for invalid is used to indicate File8 did not previously exist.

A node corresponding to File8 is inserted in the watchlist at time t8. Node5 is inserted in the watchlist at time t8. Node5 is shown to include at least an indication of File8 and its storage location "L4," which indicates Location4. Additionally, an indication of "Edge 3-5" is inserted in the watchlist node graph with information indicating Process2 is associated with Node3 and Node5. In various embodiments, the indication includes at least a process ID for Process2.

In various embodiments, weights are associated with one or more of the Nodes and Edges in the watchlist. The weights may be used to determine whether content is trusted or untrusted. The weights may depend on a variety of factors such as the source of content, the transaction type associated with content, the amount of data in the content, the content type, a number of Parent Nodes and Child Nodes were previously inserted in the watchlist and are used to create a given Child Node, and so on. When a weight of a given Node is above a threshold, the given Node may be determined to be untrusted. A further example is provided in Table 600.

Turning now to FIG. 6, a generalized diagram of one embodiment of a table for tracking weights of nodes in a node graph tracking content derived from unverified sources is shown. In the embodiment shown, fields 602-620 are fields used in each entry of the table 600. Although particular types of fields are shown and a particular order of storage is shown, in various other embodiments, other field types and a different order of storage are used to implement the table. In the embodiment shown, field 602 holds the parameter, such as a Node or Edge, for which a weight is being determined.

Fields 604-606 store the source and the corresponding weight, respectively, for the parameter. Fields 608-610 hold the data type and the corresponding weight, respectively, for the parameter. Fields 612-614 hold the data amount and the corresponding weight, respectively, for the parameter. Fields 616-618 hold the transaction type and the corresponding weight, respectively, for the parameter.

Field 620 holds the overall weight for the parameter. In various embodiments, the overall weight is product of the previous corresponding weights. In other embodiments, a different algorithm is used to combine the previous weights to determine the overall weight. In various embodiments, when the overall weight for a given Node is above a threshold, the given Node is considered to be untrusted. The threshold may be a programmable parameter. In some embodiments, a different threshold is used for different Nodes.

The illustrated embodiment uses the Nodes and Edges described earlier in FIG. 5. As shown, weights are used in the Edge entries corresponding to Processes. For these table entries, each of the source, the data amount and transaction type has a corresponding weight which contributes to the overall weight stored in the field 620. In addition, weights are used in the Node entries corresponding to Files. For these table entries, each of the source and the data type has a corresponding weight which contributes to the overall weight stored in the field 620. As the Processes read or write the data in the Files, other factors are already accounted for by using the corresponding Edge as a source.

In the illustrated embodiment, higher weights are used for untrusted sources, larger data amounts and file types corresponding to executables or archive files associated with modifying other files. For example, file extensions such as ".exe" and ".zip" used for executable file types and archive file types have higher weights. In the illustrated embodiment, a maximum weight value used is 1.0. However, a variety of other ranges for the weights are possible and contemplated.

In various embodiments, a number of Parent Nodes and Child Nodes which were previously inserted in the watchlist and are used to create a given Child Node affects the weight for the given Child Node. For example, the field 606 in the table entry for Node2 uses the product 1.0×1.0×0.9. The operands in field 606 for this table entry uses the weight for Node1, Edge1-2 and a coefficient of 0.8 to scale the weight based on Node2 being the second consecutive Node created from the content stored in the Untrusted Source such as a removable storage device or Web downloaded content. In a similar manner, field 606 of the table entries for Node3 and Node5 use decreasing coefficients 0.8 and 0.7, respectively.

Again, a variety of table arrangements, use of weights and coefficients, and algorithms for generating overall weights other than the ones depicted in table 600 are possible and contemplated. In various embodiments, the above illustrated embodiments for methods and data structures may be used by a system administrator operating an integrated security strategy for an organizational center. An integrated security strategy monitors threat levels within the organizational center. For example, a security service may use one or more embodiments of the above methods and data structures to monitor content derived from unverified sources. The security service may also be used to deploy computing devices used as endpoints, manage software licenses across the organizational center and identify and reduce security vulnerabilities in the organizational center. The security service may be provided as hardware, a virtual appliance, a cloud-based service, or a combination thereof. Examples of the security service are Symantec Information Technology (IT) Management Suite, Microsoft's System Center Configuration Manager (SCCM), IBM's United Endpoint Management and Dell's Kace Appliance.

In various embodiments, many computing devices generate data access requests to be serviced by other computing devices. Examples of the computing devices are desktop computers, a variety of servers, and a variety of mobile computing devices. The access requests are transferred over one or more network connections. In various embodiments, the computing devices are used within an organizational center.

In various embodiments, the organizational center 120 utilizes an intranet network for providing data and services accessible only to members of a particular organization. An intranet portal may be used to provide access to resources with a user-friendly interface such as graphical user interfaces (GUIs) and dashboards. In some embodiments, the organizational center is supported by software such as Microsoft SharePoint, Huddle, and Google for Work, and so forth.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

In various embodiments, program instructions of a software application are used to implement the methods and/or mechanisms previously described and are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing device for use in a computing system, the computing device comprising:
    a network interface configured to receive files via a network;
    an input/output interface configured to access files on a storage device; and
    a processing unit comprising circuitry configured to:
        determine content is untrusted in response to finding identification of the content in a watchlist of untrusted content, wherein the watchlist of untrusted content comprises an identification of untrusted files and processes;
        determine a process that is trusted touches a first file that is untrusted;
        mark the process as being untrusted, responsive to the process touching the first file;
        determine the process subsequently touches a second file not marked as untrusted; and
        mark the second file as untrusted, responsive to determining the second file is touched by the process, wherein marking the second file as untrusted comprises inserting an identification of the second file as a node in the watchlist and an identification of the process as an edge of the node in the watchlist, wherein the identification of the process associates the first file with the second file.

2. The computing device as recited in claim 1, wherein determining the first file is untrusted further comprises determining the first file is received from one of the network and the storage device.

3. The computing device as recited in claim 1, wherein marking the second file as untrusted comprises inserting an identification of a storage location storing the second file in the node of the second file in the watchlist of untrusted content.

4. The computing device as recited in claim 3, wherein the processing unit is further configured to remove the stored indication of the second file in the watchlist responsive to determining the second file has been deleted.

5. The computing device as recited in claim 1, wherein detecting the second file as being not marked as untrusted prior to being touched by the process comprises determining an identification of the second file is not found in the watchlist of untrusted content.

6. The computing device as recited in claim 1, wherein marking the second file as untrusted further comprises inserting a weight associated with the node of the second file that is indicative a number of nodes previously inserted in the watchlist and are used to create the node of the second file.

7. The computing device as recited in claim 6, wherein the processing unit is further configured to remove the stored indication of the process in the watchlist responsive to determining a given time period has elapsed.

8. The computing device as recited in claim 6, wherein the processing unit is further configured to remove the stored indication of the process in the watchlist responsive to determining the process has ceased to exist.

9. A method comprising:
    determining content is untrusted in response to finding identification of the content in a watchlist of untrusted content, wherein the watchlist of untrusted content comprises an identification of untrusted files and processes;
    determining a process in a computing system that is trusted touches a first file that is untrusted;
    marking the process as being untrusted, responsive to the process touching the first file;
    determining the process subsequently touches a second file not marked as untrusted; and marking the second file as untrusted, responsive to determining the second file is touched by the process, wherein marking the second file as untrusted comprises inserting an identification of the second file as a node in the watchlist and an identification of the process as an edge of the node in the watchlist, wherein the identification of the process associates the first file with the second file.

10. The method as recited in claim 9, wherein determining the first file is untrusted further comprises determining the first file is received from one of the network and the storage device.

11. The method as recited in claim 9, wherein marking the second file as untrusted comprises inserting an identification of a storage location storing the second file in the node of the second file in the watchlist of untrusted content.

12. The method as recited in claim 11, further comprising removing the stored indication of the second file in the watchlist responsive to determining the second file has been deleted.

13. The method as recited in claim 9, wherein detecting the second file as being not marked as untrusted prior to being touched by the process comprises determining an identification of the second file is not found in the watchlist of untrusted content.

14. The method as recited in claim 9, wherein marking the second file as untrusted further comprises inserting a weight associated with the node of the second file indicative of a number of nodes previously inserted in the watchlist.

15. The method as recited in claim 14, further comprising removing the stored indication of the process in the watchlist responsive to determining a given time period has elapsed.

16. The method as recited in claim 14, further comprising removing the stored indication of the process in the watchlist responsive to determining the process has ceased to exist.

17. A non-transitory computer readable storage medium storing program instructions, wherein the program instructions are executable by a processor to:

determine content is untrusted in response to finding identification of the content in a watchlist of untrusted content, wherein the watchlist of untrusted content comprises an identification of untrusted files and processes;

determine a process in a computing system that is trusted touches a first file that is untrusted;

mark the process as being untrusted, responsive to the process touching the first file;

determine the process subsequently touches a second file not marked as untrusted; and mark the second file as untrusted, responsive to determining the second file is touched by the process, wherein marking the second file as untrusted comprises inserting an identification of the second file as a node in the watchlist and an identification of the process as an edge of the node in the watchlist, wherein the identification of the process associates the first file with the second file.

18. The non-transitory computer readable storage device as recited in claim 17, wherein detecting the second file as being not marked as untrusted prior to being touched by the process further comprises determining an identification of the second file is not found in a watchlist of untrusted content.

19. The non-transitory computer readable storage device as recited in claim 18, wherein the program instructions are further configured to remove the stored indication of the second file in the watchlist responsive to determining the second file has been deleted.

20. The non-transitory computer readable storage device as recited in claim 17, wherein marking the second file as untrusted comprises inserting an identification of a storage location storing the second file in the node of the second file in the watchlist of untrusted content.

\* \* \* \* \*